(12) United States Patent
Goto

(10) Patent No.: US 8,126,864 B2
(45) Date of Patent: Feb. 28, 2012

(54) METHOD AND APPARATUS FOR MANAGING FOLDER

(75) Inventor: Satoru Goto, Aichi (JP)

(73) Assignee: Buffalo Inc., Nagoya-shi (JP)

( * ) Notice: Subject to any disclaimer, the term of this patent is extended or adjusted under 35 U.S.C. 154(b) by 404 days.

(21) Appl. No.: 12/392,689

(22) Filed: Feb. 25, 2009

(65) Prior Publication Data

US 2009/0216818 A1  Aug. 27, 2009

(30) Foreign Application Priority Data

Feb. 26, 2008 (JP) ................................. 2008-043694

(51) Int. Cl.
*G06F 17/30* (2006.01)
(52) U.S. Cl. ........................................ 707/705; 707/821
(58) Field of Classification Search .................. 707/705, 707/999.001, 821
See application file for complete search history.

(56) References Cited

U.S. PATENT DOCUMENTS

| | | | |
|---|---|---|---|
| 5,014,193 A * | 5/1991 | Garner et al. .................... 710/10 |
| 5,809,300 A * | 9/1998 | Utsumi et al. ..................... 713/1 |
| 6,725,394 B1 * | 4/2004 | Bolt .............................. 714/5.11 |
| 6,907,419 B1 * | 6/2005 | Pesola et al. ........................... 1/1 |
| 7,752,384 B2 * | 7/2010 | Moody et al. ................. 711/111 |
| 7,814,554 B1 * | 10/2010 | Ragner ............................ 726/27 |
| 2002/0087588 A1 * | 7/2002 | McBride et al. .............. 707/204 |
| 2004/0199639 A1 | 10/2004 | Harris |
| 2005/0149481 A1 * | 7/2005 | Hesselink et al. ................. 707/1 |
| 2005/0177641 A1 * | 8/2005 | Yamagami ..................... 709/229 |
| 2005/0193085 A1 | 9/2005 | Shimizu |
| 2006/0122955 A1 * | 6/2006 | Bethlehem et al. ................ 707/1 |
| 2007/0050538 A1 * | 3/2007 | Northcutt et al. .............. 711/112 |
| 2008/0140930 A1 * | 6/2008 | Hotchkiss ...................... 711/114 |
| 2008/0222344 A1 * | 9/2008 | Upadhyayula ..................... 711/4 |
| 2008/0270564 A1 * | 10/2008 | Rangegowda et al. ......... 709/212 |

(Continued)

FOREIGN PATENT DOCUMENTS

CN 1661570 A 8/2005

(Continued)

OTHER PUBLICATIONS

Chinese Office Action issued Oct. 25, 2010, in Patent Application No. 200910126304.1 (with English-language translation).

(Continued)

*Primary Examiner* — Hung T Vy
*Assistant Examiner* — Phuong Thao Cao
(74) *Attorney, Agent, or Firm* — Oblon, Spivak, McClelland, Maier & Neustadt, L.L.P.

(57) ABSTRACT

A method and apparatus for managing a folder is provided. The method includes: setting a drive correspondence table showing a correspondence relation of first location information including location information of an apparent drive allocated to the folder in the operating system and second location information including location information of a target drive to be actually allocated to the folder; and changing, in response to a request for an access to the folder requested by the operating system, location information allocated to the folder from the first location information of the apparent drive allocated to the folder to the second location information of the target drive allocated to the folder in accordance with the drive correspondence table without notifying the operating system of a change of location information of the drive allocated to the folder, whereby enabling the operating system to consequently access the folder in the target drive.

6 Claims, 5 Drawing Sheets

U.S. PATENT DOCUMENTS

| | | | |
|---|---|---|---|
| 2008/0288301 A1* | 11/2008 | Emling et al. | 705/4 |
| 2009/0063949 A1* | 3/2009 | Duan | 715/234 |
| 2009/0094523 A1* | 4/2009 | Treder et al. | 715/738 |
| 2009/0106263 A1* | 4/2009 | Khalid et al. | 707/10 |
| 2010/0146279 A1* | 6/2010 | Lu et al. | 713/172 |

FOREIGN PATENT DOCUMENTS

| | | |
|---|---|---|
| EP | 1 710 676 A2 | 10/2006 |
| JP | 2005-301752 | 10/2005 |

OTHER PUBLICATIONS

Ajay Chander, et al., "NEVRLATE: Scalable Resource Discovery", Proceedings of the $2^{nd}$ IEEE/ACM International Symposium on Cluster Computing and the Grid, XP010853465, May 21, 2002, pp. 1-7.

* cited by examiner

FIG. 4

DRIVE CORRESPONDENCE TABLE

| APPARENT DRIVE | TARGET DRIVE |
|---|---|
| C: ¥test | D: ¥target |
| ⋮ | ⋮ |

METHOD AND APPARATUS FOR MANAGING FOLDER

CROSS-REFERENCE TO RELATED APPLICATIONS

This application is based on and claims the priority from Japanese Patent Application No. 2008-043694 filed on Feb. 26, 2008, the entire contents of which are incorporated herein by reference.

TECHNICAL FIELD

The present invention relates to a method and apparatus for managing a folder in a computer operable under an operating system and capable of selecting a storage destination of the folder from a plurality of drives.

BACKGROUND

A personal computer (hereinafter referred to as a "PC") generally includes a storage for storing data. The data can be stored on an external storage device attached to the PC or connected via a network. JP-A-2005-301752 describes a file management method for a shared file stored on a server connected to a client via a network.

In a PC having Microsoft Windows (Registered Trademark) as an operating system, an internal drive (a drive for an internal storage such as a built-in disk drive) is recognized as the C drive by default. In contrast, an external drive (a drive for an external storage such as an external disk) attached to the PC for expanding memory capacity is recognized as the D drive by default.

A default folder in the internal drive, e.g., a "My Documents" is most commonly used by a user of the PC as a destination to store data. Specifically, it is the most common practice for the user to create a new folder below "My Documents."

However, when the storage area assigned to "My Documents" becomes full or nearly full, the user needs to store data in another folder in the same internal drive or in another drive (e.g., an external drive).

For instance, in a case where an additional drive, such as an external drive, is used as a drive allocated to the new folder in place of the "My Documents" folder, when the user creates a new folder, the new folder is recognized as another drive that is not the C drive. Although it is possible to create a shortcut as a link to the new folder, a target drive is not recognized as a folder by the shortcut, which deteriorates the user's operability.

SUMMARY

The present invention was made in consideration of the above-described circumstances, and an object thereof is to provide a method and apparatus for managing a folder in a computer, which runs on an operating system and which can select a storage destination for a folder from a plurality of drives, with enhanced user's operability.

According to a first aspect of the invention, there is provided a method for managing a folder by a computer that is operable under an operating system and capable of selecting a storage destination of the folder from a plurality of drives, said method comprising: setting a drive correspondence table showing a correspondence relation of first location information and second location information, the first location information including location information of an apparent drive allocated to the folder in the operating system, and the second location information including location information of a target drive to be actually allocated to the folder; and changing, in response to a request for an access to the folder requested by the operating system, location information of the drive allocated to the folder from the first location information of the apparent drive allocated to the folder to the second location information of the target drive allocated to the folder in accordance with the drive correspondence table without notifying the operating system of a change of location information of the drive allocated to the folder, whereby enabling the operating system to consequently access the folder in the target drive.

According to a second aspect of the invention, there is provided an apparatus for managing a folder, the apparatus operable under an operating system and capable of selecting a storage destination of the folder from a plurality of drives, the apparatus comprising: a setting unit configured to set a drive correspondence table showing a correspondence relation of first location information and second location information, the first location information including location information of an apparent drive allocated to the folder in the operating system, and the second location information including location information of a target drive to be actually allocated to the folder; and a drive change unit configured, in response to a request for an access to the folder requested by the operating system, to change location information of the drive allocated to the folder from the first location information of the apparent drive allocated to the folder to the second location information of the target drive allocated to the folder in accordance with the drive correspondence table without notifying the operating system of a change of location information of the drive allocated to the folder, whereby enabling the operating system to consequently access the folder in the target drive.

According to a third aspect of the invention, there is provided a computer-readable medium having a computer program stored thereon and readable by a computer, said computer program, when executed by the computer, causes the computer to perform operations comprising: setting a drive correspondence table showing a correspondence relation of first location information and second location information, the first location information including location information of an apparent drive allocated to the folder in the operating system, and the second location information including location information of a target drive to be actually allocated to the folder; and changing, in response to a request for an access to the folder requested by the operating system, location information of the drive allocated to the folder from the first location information of the apparent drive allocated to the folder to the second location information of the target drive allocated to the folder in accordance with the drive correspondence table without notifying the operating system of a change of location information of the drive allocated to the folder, whereby enabling the operating system to consequently access the folder in the target drive.

BRIEF DESCRIPTION OF THE DRAWINGS

FIG. 4 is a schematic diagram showing a drive correspondence table created by executing step S2 shown in FIG. 2.

DESCRIPTION

One of more specific embodiments of the present invention will be described in detail hereunder with reference to the drawings.

Figure 1:
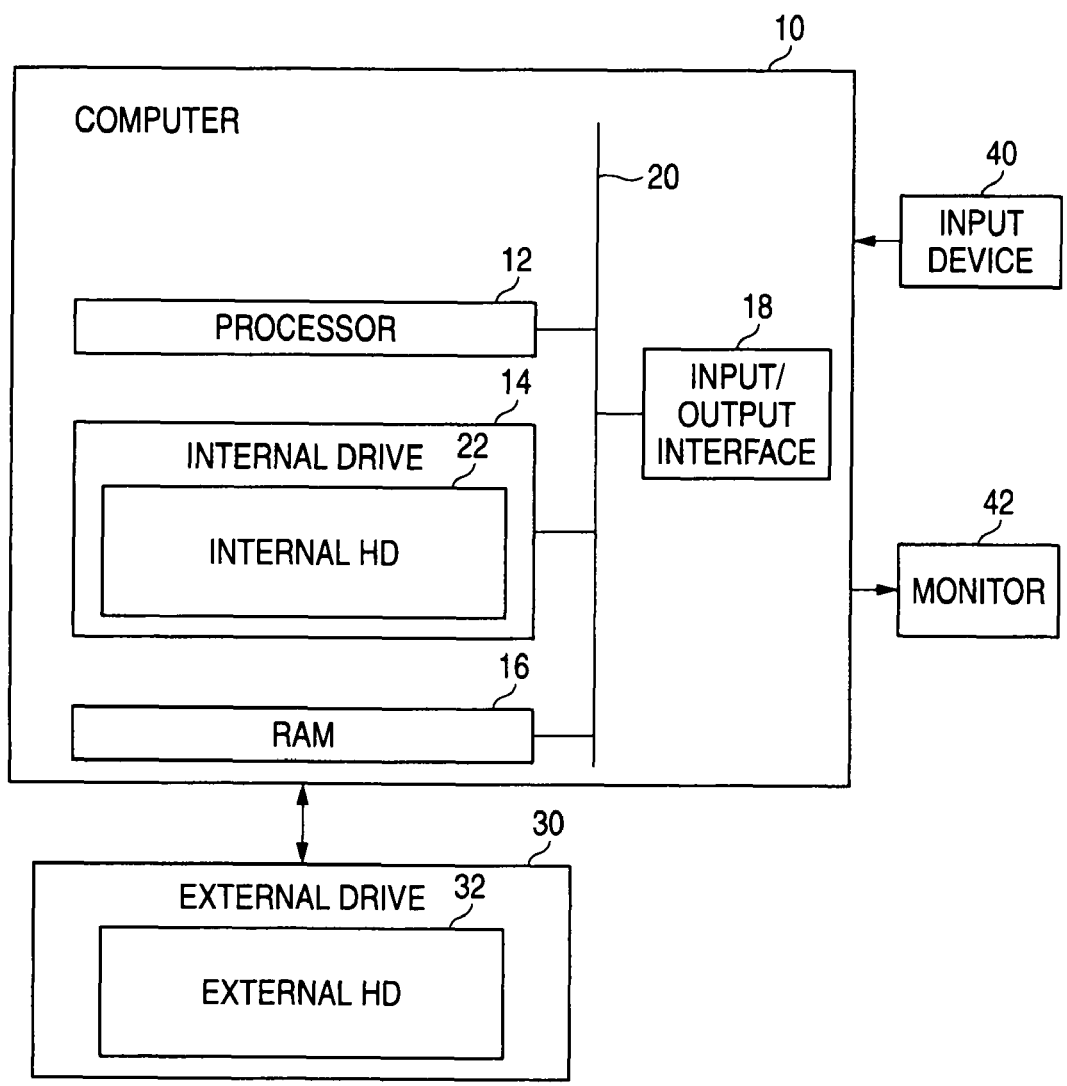
FIG. 1 is a block diagram schematically showing a hardware configuration of a computer that implements a folder management method according to an embodiment of the present invention.

FIG. 1 is a block diagram schematically showing a hardware configuration of a computer 10 that implements a folder management method according to an embodiment of the present invention.

The computer 10 includes a processor 12 such as a Central Processing Unit (CPU) ; an internal drive 14; a Random Access Memory (RAM) 16; and an input/output interface 18. The processor 12, the internal drive 14, the RAM 16, and the input/output interface 18 are interconnected by a bus 20.

The internal drive 14 is a recorder configured to read and write data from and on an internal hard disk drive (hereinafter referred to as an "internal HD") 22 serving as an internal storage. An operating system (hereinafter referred to as an "OS") for the computer 10 is stored on the internal HD 22. The OS may be previously stored on the internal HD 22. The OS in the present embodiment is Microsoft Windows (Registered Trademark), but it is not limited thereto. A folder management program is stored on the internal HD 22. The folder management program may be previously stored on the internal HD 22 or may be stored on an external recording medium such as a compact disk, a digital versatile disk, or a removable memory. The folder management program may be previously stored on an external drive 30, and the PC 10 may obtain the folder management program from the external drive 30.

A folder called "My Documents" is automatically created within the internal HD 22 as a default folder by the OS. Further, the user can create folders other than the "My Documents" folder in the internal HD 22 by the OS. The OS maps a plurality of created folders by allocating a drive letter to each of the created folders.

The processor 12 performs processing by execution of various programs stored on the internal HD 22. The RAM 16 is a working memory for temporarily storing various sets of data when running a program.

As shown in FIG. 1, the external drive 30 is removably attached to the computer 10. The external drive 30 is usually attached to the computer 10 by the user, as required. The external drive 30 is a recorder configured to read and write data from and into an external hard disk drive (hereinafter referred to as an "external HD") 32 serving as an example of an external storage.

As shown in FIG. 1, an input device 40 and a monitor 42 are further connected to the computer 10. The input device 40 includes, for example, a mouse and a keyboard such that the user can perform input operation to the computer 10 through the input device 40. The monitor 42 includes a screen for visualizing and displaying information. The processor 12 performs various types of processing in accordance with instructions input through the input device 40, i.e., user's input operation.

Figure 2:
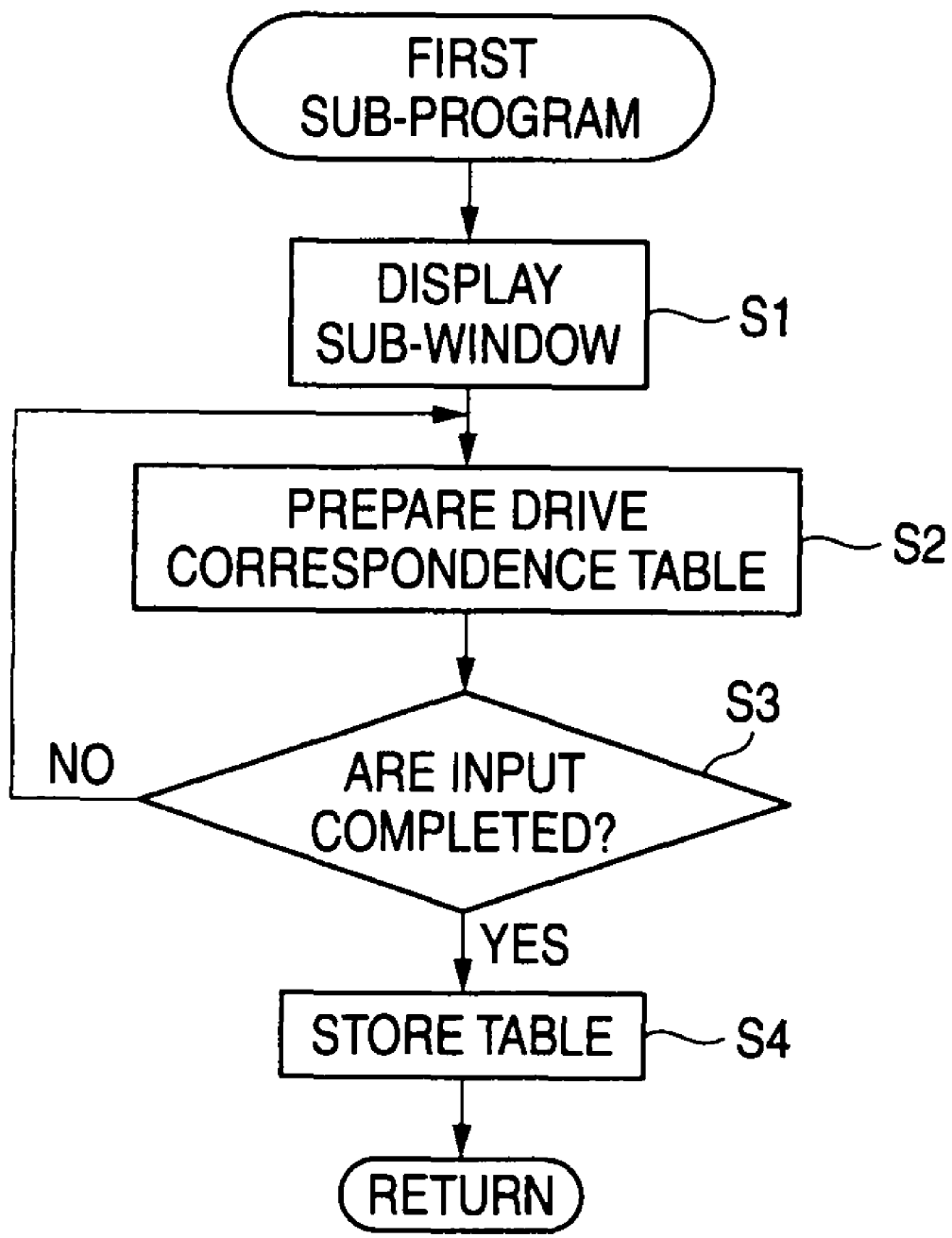
FIG. 2 is a flowchart schematically showing operations instructed by a first sub-program of a folder management program executed by the processor shown in FIG. 1.
Figure 3:
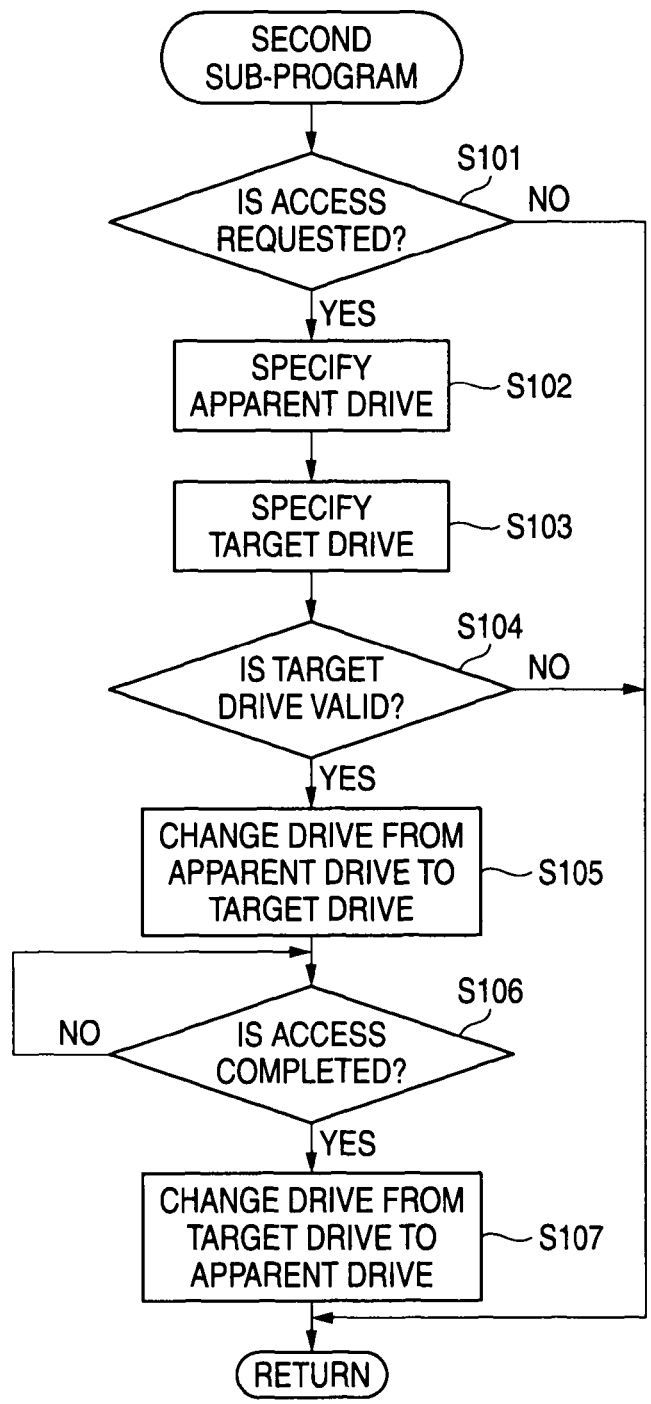
FIG. 3 is a flowchart schematically showing operations instructed by a second sub-program of the folder management program executed by the processor shown in FIG. 1.

FIG. 2 is a flowchart schematically showing operations instructed by a first sub-program of the folder management program. FIG. 3 is a flowchart schematically showing operations instructed by a second sub-program.

The first sub-program shown in FIG. 2 is executed by the processor 12 for generally creating a drive correspondence table shown in FIG. 4 pursuant to a user's input. In other words, the first sub-program is a part of the folder management program which is executed to create a drive correspondence table.

In contrast, when the OS issues a signal which indicates that the OS is making an attempt to access one of the folders, the second sub-program shown in FIG. 3 is executed in response to the signal so as to reassign the drive allocated to the folder to another drive, thereby enabling an access to a location different from the location of the drive recognized by the OS. In short, the second sub-program is a part of the folder management program which is executed to change the location information in connection to the drive allocated to the folder to be accessed.

The first sub-program shown in FIG. 2 is executed in response to a setting request input from the input device 40 by the user. In step S1, when the first sub-program is executed, a sub-window is displayed on a screen of a monitor 42. The sub-window assists the user to create a drive correspondence table.

Next, when the user inputs data by way of the sub-window in step S2, a drive correspondence table is created. In the example shown in FIG. 5, the name of an apparent folder on the OS is "test," and a drive allocated to the folder is the C drive (i.e., the internal drive 14). In contrast, the name of a target folder to which the apparent folder is to be reassigned is "target," and a drive allocated to the target file is the D drive (i.e., the external drive 30).

The sub-window includes, for example, a first entry field for inputting location information of the apparent folder on the OS; and a second entry field for inputting location information of the target folder. By inputting location information in the entry fields, the drive correspondence table is created.

The location information of the apparent folder or the target folder designated on the sub-window may be location information of a folder selected from previously created folders (i.e., a folder present on a drive) or may be location information of an uncreated folder (i.e., a folder not present on a drive). If the location information of the uncreated folder is designated, a new folder is created at a location defined by the designated location information according to the execution of the first sub-program. For example, the sub-window can allow the target folder to be selected from the folders on the target drive (e.g., "target" folder on the D drive), and the apparent folder to be designated by inputting arbitrarily location information (e.g., apparent drive: C drive, folder name: test). In response to the designation, the drive correspondence table is created, and a new folder (e.g., "test" folder) is automatically created on the designated apparent drive (e.g., C drive). Accordingly, it is not necessary for the user to create an apparent folder prior to the designation on the sub-window. However, the invention is not limited thereto, and the sub-window may allow both the apparent folder and the target folder to be selected from the previously created folders, or may allow both the apparent folder and the target folder to be designated by inputting arbitrarily location information and automatically created.

Subsequently, in step S3, it is determined whether the input to the sub-window is completed. If the input is completed (step S3: YES), the process proceeds to step S4, and the drive correspondence table is stored in an area of the internal HD 22 of the internal drive 14.

One execution of the first sub-program is now completed.

The second sub-program shown in FIG. 3 is repeatedly executed by the processor 12. In step S101, it is determined whether the OS has issued a signal which indicates that the OS is making an attempt to access one of the folders in step S101. In other words, it is determined whether a request for access has been issued.

If the access request is not issued (step S101: NO), one execution of the second sub-program is immediately terminated. In contrast, if the access request has been issued (step S101: YES), then processing proceeds to step S102.

In step S102, a folder name of a folder (an object folder), to which the OS is about to make an access, is specified based on information from the OS. In step S102, a drive (an apparent drive) assigned by the OS and allocated to the object folder is also specified based on the information from the OS.

Subsequently, in step S103, a target drive corresponding to the present object folder is specified by making a reference to the drive correspondence table stored in a predetermined area of the internal HD 22 (see FIG. 4).

Subsequently, in step S104, it is determined whether the specified target drive is currently valid. For example, when the present target drive is the external drive 30 that is removably attached to the PC 10, the external drive 30 may not be actually connected to the PC 10. For this reason, in step S104, it is determined whether the target drive is currently valid.

If the target drive is valid this time (step S104: YES), processing proceeds to steps S104 through S107 which are a group of steps for changing and restoring a drive. In contrast, if the target drive is not valid (step S104: NO), the group of steps for changing and restoring a drive is skipped, and changing and restoration of the drive are consequently inhibited.

Figure 5:
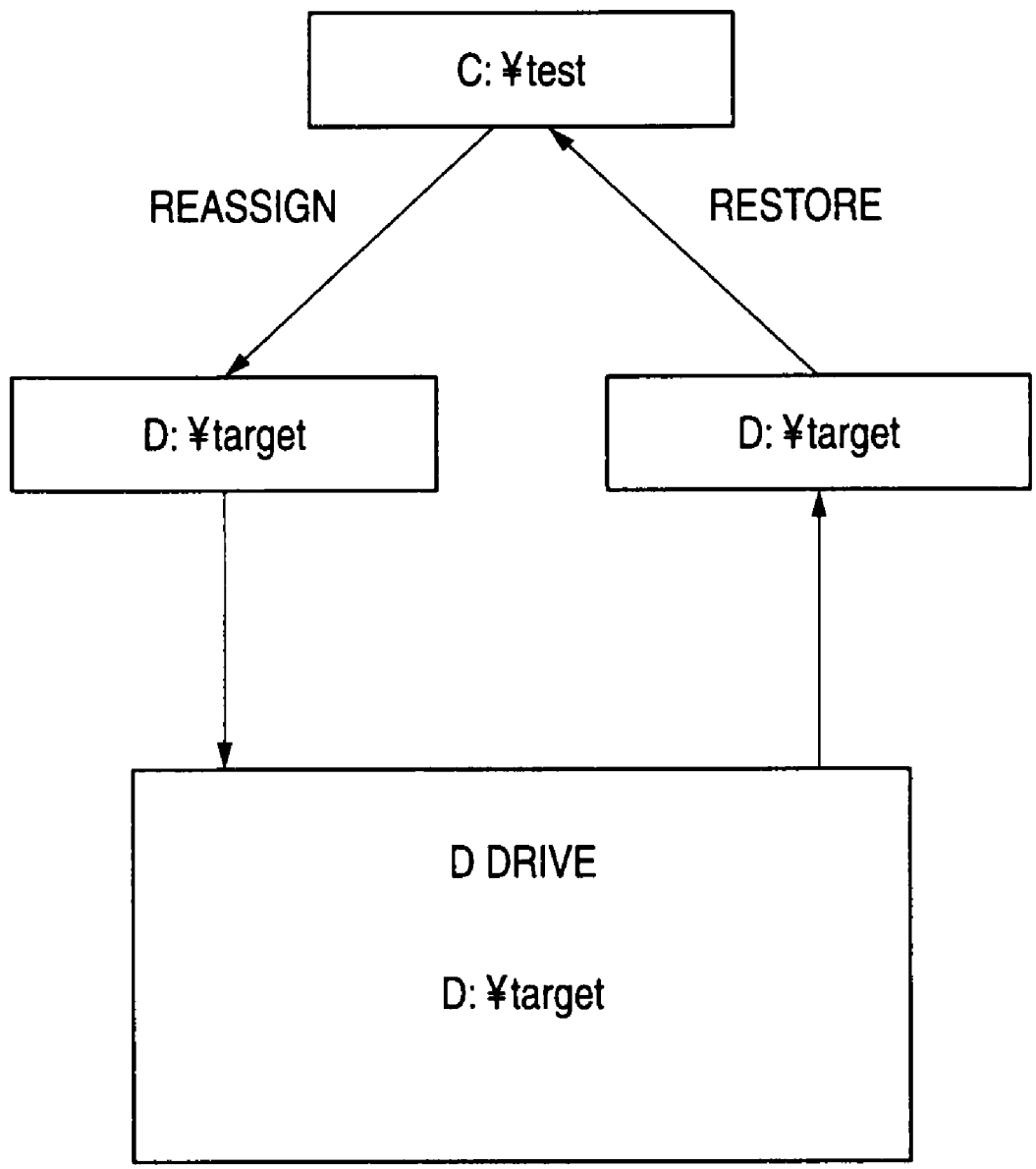
FIG. 5 is a schematic diagram explaining an execution of the second sub-program shown in FIG. 3.

When the target drive is valid, the drive actually allocated to the present object folder is changed from the apparent drive to the target drive in step S105. For example, as shown in FIG. 5, a drive of the object folder (along with its name, if necessary) is reassigned to another drive without permission of the OS. As a result, the target drive can pretend the apparent drive.

Consequently, when the OS subsequently attempts to access the present object folder, the OS eventually accesses the target drive without recognition.

Subsequently, in step S106, the access to the file by the OS is terminated, and reading of a file from the target drive is awaited. If the file is read (step S106: YES), then processing proceeds to step S107.

In step S107, the drive (along with its folder name, if necessary) allocated to the folder read from the target drive is restored as shown, for example, in FIG. 5. Therefore, the OS actually accesses the target drive without recognizing that the access has been made to the target drive.

One execution of the second sub-program is now completed.

In the above-described embodiments, the drive correspondence table is created by the user's input. However, the present invention is not limited thereto. For example, if the user creates a new folder in the C drive but a remaining capacity of the C drive is less than a threshold amount, a new folder may be automatically created in an external drive being connected to the computer 10, and a drive correspondence table showing a correspondence relation of the new folder on the C drive and the new folder on the external drive may be automatically created. In other words, under a given condition, the newly created folder in the C drive may be automatically designated as the apparent folder, and the target folder may be automatically created.

The above-described embodiment of the invention provides the following exemplified aspects.

(1) A method for managing a folder by a computer that is operable under an operating system and capable of selecting a storage destination of the folder from a plurality of drives, said method comprises: setting a drive correspondence table showing a correspondence relation of first location information and second location information, the first location information including location information of an apparent drive allocated to the folder in the operating system, and the second location information including location information of a target drive to be actually allocated to the folder; and changing, in response to a request for an access to the folder requested by the operating system, location information allocated to the folder from the first location information of the apparent drive allocated to the folder to the second location information of the target drive allocated to the folder in accordance with the drive correspondence table without notifying the operating system of a change of the drive allocated to the folder, whereby enabling the operating system to consequently access the folder in the target drive.

(2) The method may further comprises: restoring the location information of the drive allocated to the folder by changing, after the operating system has completed an access to the folder, the location information of the drive allocated to the folder from the second location information of the target drive to the first location information of the apparent drive in accordance with the set drive correspondence table without notifying the operating system of the drive allocated to the folder.

An example of the "setting" process may include step S2 shown in FIG. 2, an example of the "changing" process may include steps S102, S103, and S105 shown in FIG. 3, and an example of the "restoring" process may include steps S106 and S107 shown in FIG. 3.

According to the method, a drive correspondence table is set, for example, pursuant to a user's input. The drive correspondence table shows the correspondence between a location of an apparent drive allocated to each of designated folders in an operating system and a location of a target drive desired to be actually allocated to each of the designated folders by the user.

Further, in accordance with the set drive correspondence table, the designation of a drive allocated to the same folder is changed without being recognized by the OS, and an access is then actually made to the drive having the changed designation. After completion of the access, the designation of the drive is restored. Hence, the OS does not recognize the change in the designation of the drive made in the course of the access.

Therefore, according to the method, when the user selects a drive that can be perceived by the OS, an access is automatically made to a drive previously designated by the user rather than to the selected drive. Reassignment of the drive is performed without being recognized by the OS. As a consequence, the essential requirement for the user is to simply select a folder regardless of whether the drive perceived by the OS and the drive to be actually accessed are identical with each other. As a consequence, the user's operability is enhanced.

The computer may be any type of computer such as a desktop computer (e.g., a personal computer), a portable computer (e.g., a PDA or a portable cellular phone), etc.

(3) The method may further comprise: determining, in response to the request for access to the folder requested by the operating system, whether the target drive allocated to the folder is valid in the computer or not; and inhibiting, when the target drive is not determined to be valid, to change the location information of the drive allocated to the folder from the first location information to the second location information.

An example of a "determining" process may include step S104 shown in FIG. 3, and an example of a "inhibiting" process may include an operation to skip steps S105 through S107 if the result of the determination in step S104 is No.

According to the method, changing of the drive allocated to the object folder to a target drive, which would otherwise be caused in spite of the fact that the target drive is not valid, is inhibited. As a consequence, an access failure attributable to a change in drive is prevented.

(4) In the method, the target drive may be an external drive removably attached to the computer.

According to the method, a change of the drive allocated to the object folder to an external drive is inhibited if the external drive as the target drive is not attached to the computer. As a consequence, an access failure attributable to a change in drive is prevented.

(5) A program causes a computer to perform operations of the above-described methods when the program is executed.

So long as the program is executed by the computer, a similar effect to the methods can be obtained.

The program may be a combination of commands executed by a computer to implement functions of the program, may include a file and data to be processed in accordance with the commands as well as the combination of the commands. However, the program is not limited thereto.

The program can be embodied such that an intended object is achieved by solely executing the program by the computer, or an intended object is achieved by executing the program in conjunction with another program by the computer. In the latter case, the program can be embodied as being principally made up of data. However, the program is not limited thereto.

(6) A computer-readable medium has the computer program of the above item (5) stored thereon and is readable by a computer.

So long as the program recorded in the computer-readable medium is executed by the computer, an effect similar to the above-described method can be obtained.

The computer readable medium may be in various formats for example, a magnetic recording medium such as a flexible disk, an optical recording medium such as a CD and a CD-ROM, a magneto-optical recording medium such as an MO, an non-removable storage such as ROM, but it is not limited thereto.

(7) An apparatus for managing a folder is operable under an operating system and capable of selecting a storage destination of the folder from a plurality of drives. The apparatus comprises: a setting unit configured to set a drive correspondence table showing a correspondence relation of first location information and second location information, the first location information including location information of an apparent drive allocated to the folder in the operating system, and the second location information including location information of a target drive to be actually allocated to the folder; and a drive change unit configured, in response to a request for an access to the folder requested by the operating system, to change location information allocated to the folder from the first location information of the apparent drive allocated to the folder to the second location information of the target drive allocated to the folder in accordance with the drive correspondence table without notifying the operating system of a change of the drive allocated to the folder, whereby enabling the operating system to consequently access the folder in the target drive.

(8) The apparatus may further comprise: a drive restoration unit configured, after the operating system has completed an access to the folder, to restore the location information of the drive allocated to the folder by changing the location information of the drive allocated to the folder from the second location information of the target drive to the first location information of the apparent drive in accordance with the set drive correspondence table without notifying the operating system of the drive allocated to the folder.

(9) The apparatus may further comprise: a determination unit configured, in response to the request for access to the folder requested by the operating system, to determine whether the target drive allocated to the folder is valid in the computer or not; and a inhibiting unit configured to inhibit to change the location information of the drive allocated to the folder from the first location information to the second location information, when the target drive is not determined to be valid.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for managing a folder by a computer that is operable under an operating system and capable of selecting a storage destination of the folder from a plurality of drives, said method comprising:

setting a drive correspondence table showing a correspondence relation of first location information and second location information, the first location information including location information of an apparent drive allocated to the folder in the operating system, and the second location information including location information of a target drive to be actually allocated to the folder, wherein the apparent drive is an internal drive of the computer and the target drive is an external drive connected to the computer via a direct local connection;

changing, in response to a request for an access to the folder requested by the operating system, location information of a drive allocated to the folder from the first location information of the apparent drive allocated to the folder to the second location information of the target drive allocated to the folder in accordance with the drive correspondence table without notifying the operating system of a change of location information of a drive allocated to the folder;

determining, in response to the request for access to the folder requested by the operating system, whether the target drive allocated to the folder is valid in the computer or not; and inhibiting, when the target drive is determined to be not valid, to change the location information of the drive allocated to the folder from the first location information to the second location information.

2. The method according to claim 1 further comprising:

restoring the location information of the drive allocated to the folder by changing, after the operating system has completed an access to the folder, the location information of the drive allocated to the folder from the second location information of the target drive to the first location information of the apparent drive in accordance with the set drive correspondence table without notifying the operating system of a change of location information of the drive allocated to the folder.

3. The method according to claim 1, wherein the first location information comprises a first drive letter assigned to the apparent drive allocated to the folder, and the second location information comprises a second drive letter assigned to the target drive allocated to the folder.

4. An apparatus for managing a folder, the apparatus operable under an operating system and capable of selecting a storage destination of the folder from a plurality of drives, the apparatus comprising:
a processor configured to:
set a drive correspondence table showing a correspondence relation of first location information and second location information, the first location information including location information of an apparent drive allocated to the folder in the operating system, and the second location information including location information of a target drive to be actually allocated to the folder, wherein the apparent drive is an internal drive of the apparatus and the target drive is an external drive connected to the apparatus via a direct local connection;
change, in response to a request for an access to the folder requested by the operating system, location information of a drive allocated to the folder from the first location information of the apparent drive allocated to the folder to the second location information of the target drive allocated to the folder in accordance with the drive correspondence table without notifying the operating system of a change of location information of a drive allocated to the folder;
determine whether the target drive allocated to the folder is valid in the apparatus or not in response to the request for access to the folder requested by the operating system; and
inhibit to change the location information of the drive allocated to the folder from the first location information to the second location information, when the target drive is determined to be not valid.

5. The apparatus according to claim 4, wherein the processor is configured, after the operating system has completed an access to the folder, to restore the location information of the drive allocated to the folder by changing the location information of the drive allocated to the folder from the second location information of the target drive to the first location information of the apparent drive in accordance with the set drive correspondence table without notifying the operating system of a change of location information of the drive allocated to the folder.

6. A non-transitory computer-readable medium having a computer program stored thereon and readable by a computer, said computer program, when executed by the computer, causes the computer to perform operations comprising:
setting a drive correspondence table showing a correspondence relation of first location information and second location information, the first location information including location information of an apparent drive allocated to the folder in the operating system, and the second location information including location information of a target drive to be actually allocated to the folder, wherein the apparent drive is an internal drive of the computer and the target drive is an external drive connected to the computer via a direct local connection;
changing, in response to a request for an access to the folder requested by the operating system, location information of a drive allocated to the folder from the first location information of the apparent drive allocated to the folder to the second location information of the target drive allocated to the folder in accordance with the drive correspondence table without notifying the operating system of a change of location information of a drive allocated to the folder;
determining, in response to the request for access to the folder requested by the operating system, whether the target drive allocated to the folder is valid in the computer or not; and
inhibiting, when the target drive is determined to be not valid, to change the location information of the drive allocated to the folder from the first location information to the second location information.

* * * * *